United States Patent
Kuo et al.

(10) Patent No.: US 10,508,385 B2
(45) Date of Patent: Dec. 17, 2019

(54) CLOTH POSITIONER FOR CONTINUOUS PROCESSING

(71) Applicant: Wholeknit International Co., Ltd., Apia (WS)

(72) Inventors: Ming-Sheng Kuo, Apia (WS); Yu-Lin Li, Apia (WS); Chien-Hui Yang, Apia (WS)

(73) Assignee: WHOLEKNIT INTERNATIONAL CO., LTD., Apia (WS)

( * ) Notice: Subject to any disclaimer, the term of this patent is extended or adjusted under 35 U.S.C. 154(b) by 476 days.

(21) Appl. No.: 15/332,169

(22) Filed: Oct. 24, 2016

(65) Prior Publication Data

US 2018/0112351 A1    Apr. 26, 2018

(51) Int. Cl.
| | |
|---|---|
| *D06H 7/00* | (2006.01) |
| *A41H 15/00* | (2006.01) |
| *B23K 37/04* | (2006.01) |
| *B23K 26/38* | (2014.01) |
| *B23K 103/00* | (2006.01) |

(52) U.S. Cl.
CPC ............. *D06H 7/00* (2013.01); *A41H 15/00* (2013.01); *B23K 26/38* (2013.01); *B23K 37/0408* (2013.01); *B23K 2103/38* (2018.08)

(58) Field of Classification Search
CPC .... A41H 15/00; B23K 2103/38; B23K 26/38; B23K 37/0408; B26D 7/018; B26D 7/20; B26D 7/015; D05B 39/00; D06H 7/00; F16B 19/00
USPC ............... 223/108; 269/289 R, 302.1, 37, 55
See application file for complete search history.

(56) References Cited

U.S. PATENT DOCUMENTS

| | | | | |
|---|---|---|---|---|
| 1,977,709 A | * | 10/1934 | Altvater | C14B 5/02 83/468 |
| 2,826,158 A | * | 3/1958 | Phillips, Jr. | D05B 3/10 112/148 |
| 4,510,876 A | * | 4/1985 | Garley | D05B 39/00 112/121 |
| 4,593,634 A | * | 6/1986 | Moreno | D05B 31/00 112/470.06 |
| 4,822,015 A | * | 4/1989 | Glasman | A41H 15/00 269/54.1 |
| 5,007,357 A | * | 4/1991 | Takenoya | D05B 3/243 112/102.5 |
| 7,469,886 B2 | * | 12/2008 | Shen | B25B 11/005 269/21 |

FOREIGN PATENT DOCUMENTS

CN          103332224 A  * 10/2013

* cited by examiner

*Primary Examiner* — Joseph J Hail
*Assistant Examiner* — Arman Milanian
(74) *Attorney, Agent, or Firm* — Muncy, Geissler, Olds & Lowe, P.C.

(57) ABSTRACT

A cloth positioner for continuous processing according to this invention includes a processing base, an alignment plate provided on the processing base, and at least one figure position abutment pin piece. The processing base includes a plurality of thru holes. The alignment plate includes at least one pin piece slot matching with the figure position abutment pin piece, a plurality of air pressure vents, and at least one laser cutting line groove. With the figure position abutment pin piece that is provided for fixing a cloth onto the pin piece slot, the cloth is positioned on the cloth positioner for continuous processing.

12 Claims, 10 Drawing Sheets

CLOTH POSITIONER FOR CONTINUOUS PROCESSING

FIELD OF THE INVENTION

This invention relates to a holding pattern die for processing and particularly to a cloth positioner for continuous processing.

BACKGROUND OF THE INVENTION

A so-called cloth is a material that may be made into a garment or upper as a semi-product. The so-called continuous processing is herein a processing procedure, comprising at least an ironing step, a thermo-compression step, a printing and dyeing step, and a cutting step. In an existing technology, before being processed in one of the above processing procedures, the cloth generally needs to be located different holding pattern dies and is re-positioned. However, once the cloth is re-positioned, one more offset error value is given; namely, the cloth has different portions that originally apply different forces of tension, so once the cloth is processed in one processing procedure, such as ironing or thermo-compression, the cloth has an irregular outer profile. Thus, when the cloth is re-located on a different holding pattern die one more time for a next processing procedure, such as printing and dyeing or cutting, the cloth must be re-positioned, thereby a higher offset error value being given. It is apparent from the above description that to use same holding pattern die for the cloth in different processing procedures is an important condition to increase the processing precision and the production efficiency and is the most important task of achievement of the thorough automatic processing.

Consequently, because of the technical defects described above, to provide the rotary valve improver, the applicant, based on many years of research and experience in the relevant industry, has developed the present invention, which may effectively improve the defects described above.

SUMMARY OF THE INVENTION

In order to solve the technical issue mentioned above, this invention is mainly to provide a cloth positioner that may be repeatedly used in different processing procedures for significantly increasing the processing precision and the yield factor of a finished product, thereby practically overcoming the barrier of thorough automatic processing. This invention is further to provide a cloth positioner that may be repeatedly used for effectively decreasing the cost of a fixture and the waste of resources, thereby increasing the industrial competitiveness.

Accordingly, a cloth positioner for continuous processing according to this invention is provided. The cloth positioner comprises a processing base, an alignment plate provided on the processing base, and at least one figure position abutment pin piece. The processing base includes a plurality of thru holes. The alignment plate includes at least one pin piece slot matching with the figure position abutment pin piece, a plurality of air pressure vents, and at least one laser cutting line groove. With the figure position abutment pin piece that is provided for fixing a cloth onto the pin piece slot, the cloth is positioned on the cloth positioner for continuous processing.

Further, in the cloth positioner for continuous processing, the figure position abutment pin piece comprises a body used for matching with and being loaded into the pin piece slot, and a clamping part used for connecting to the body and fixing the cloth.

Further, in the cloth positioner for continuous processing, the clamping part is an industrial and high-temperature-resistant magic felt or a metal nail.

Further, in the cloth positioner for continuous processing, the body is a high-temperature-resistant wooden sheet or plastic sheet.

Further, in the cloth positioner for continuous processing, the means of fixing of the body to the clamping part is implemented optionally with machine sewing, gluing, riveting, or screwing or their combination.

Further, in the cloth positioner for continuous processing, a frame is set around the processing base.

In the technical manner mentioned above, it is known that this invention is better than the conventional means because having the following advantages. 1. The cloth positioner according to this invention may be repeatedly used in different processing procedures, so no offset error value is given in different processing procedures, which thereby significantly increases the processing precision and the yield factor of a finished product and practically overcomes the barrier of thorough automatic processing. 2. The cloth positioner according to this invention may be repeatedly used in different processing procedures, operators needn't waste time in re-positioning in different processing procedures, thereby the amount of products been effectively increased. 3. The cloth positioner according to this invention may be repeatedly used, so the cost of a fixture and the waste of resources may be decreased, thereby increasing the industrial competitiveness.

The foregoing objectives and summary provide only a brief introduction to the present invention. Other objects, features, and advantages of the present invention will become conspicuous to those skilled in the art upon reading the following detailed descriptions accompanying by the illustrations.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
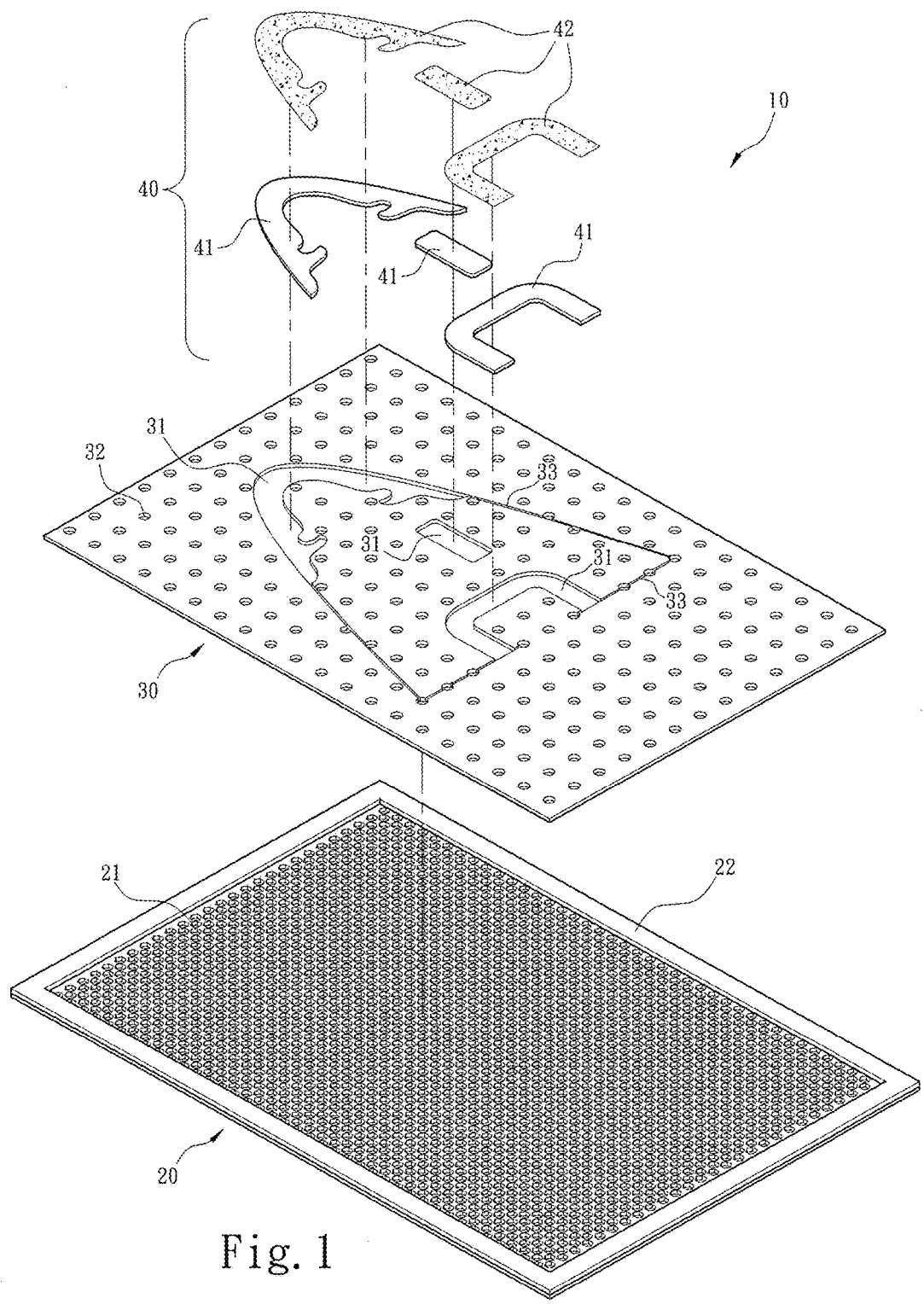
FIG. 1 is an exploded view of the isometric appearance of a cloth positioner in a first preferred embodiment of this invention.
Figure 2:
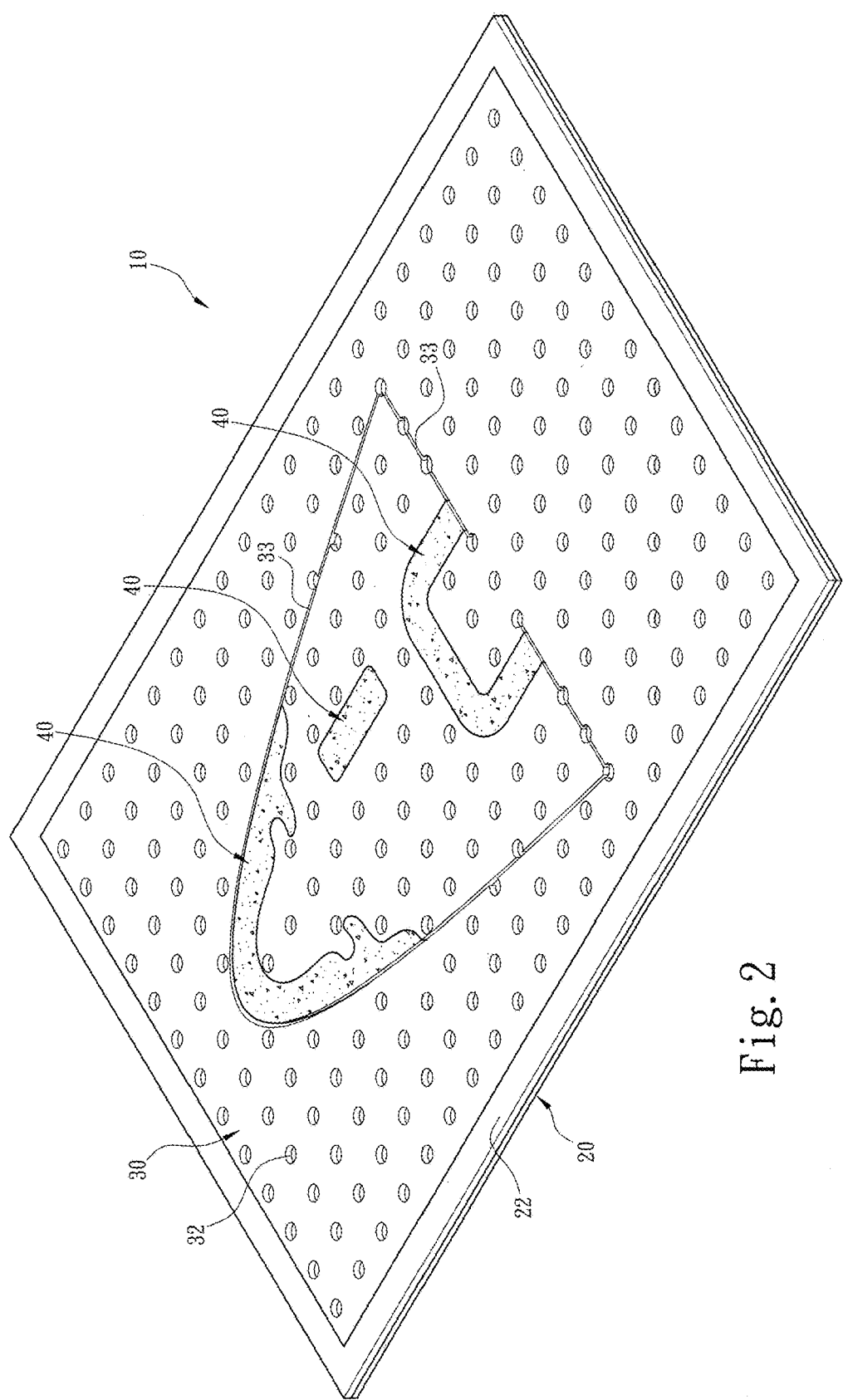
FIG. 2 is a schematic view of the isometric appearance of the assembled cloth positioner of FIG. 1.
Figure 3:
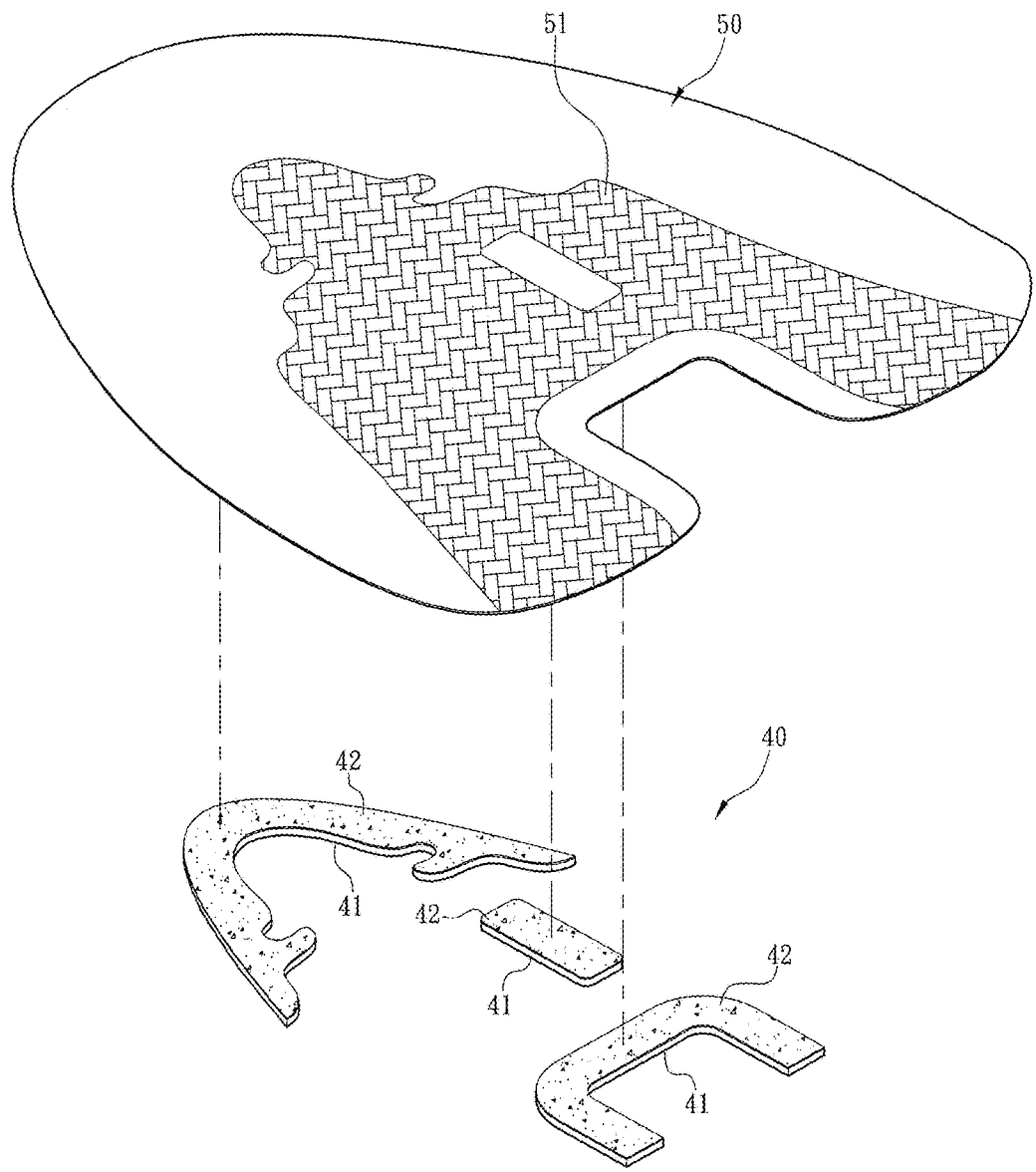
FIG. 3 is a schematic view of the isometric appearance of the cloth positioner in which a figure position abutment pin piece is positioned in and fixed to a cloth in the first preferred embodiment of this invention.
Figure 7:
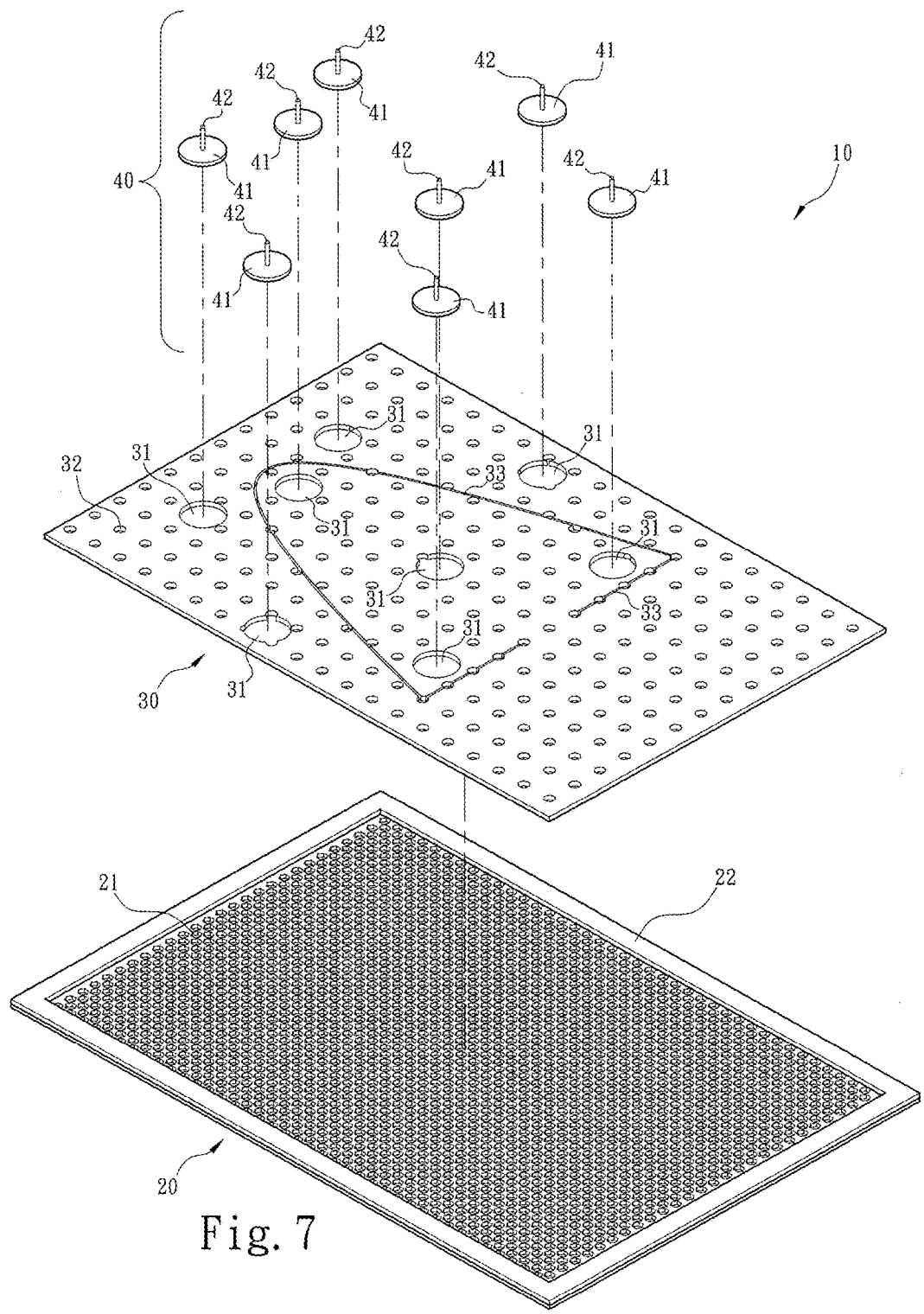
FIG. 7 is an exploded view of the isometric appearance of the cloth positioner in a second preferred embodiment of this invention.
Figure 8:
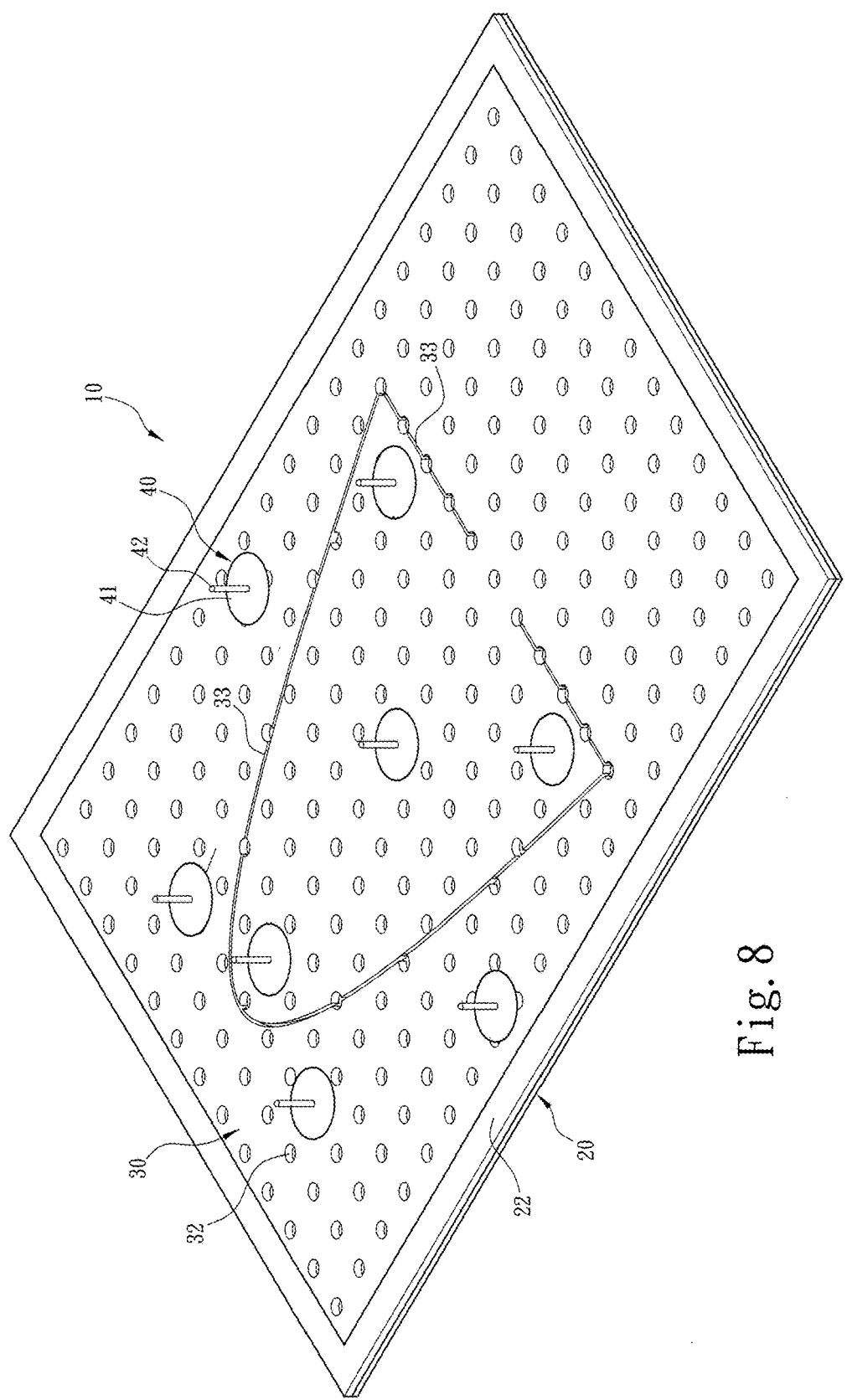
FIG. 8 is a schematic view of the isometric appearance of the assembled cloth positioner of FIG. 7.

In order to further know the features and technical means of a cloth positioner for continuous processing according to this invention, refer to preferred embodiments and detailed description according to this invention accompanied with drawings. Firstly, refer to FIGS. 1 through 3 and FIGS. 7 and 8 that illustrate respectively schematic exploded and assembly views of the isometric appearance of the cloth positioner in which a figure position abutment pin piece is positioned in and fixed to the a cloth in the a first preferred embodiment of this invention and schematic exploded and assembly views of the isometric appearance of the cloth positioner in which the figure position abutment pin piece is positioned in and fixed to the cloth in the a second preferred embodiment of this invention. From the figures, it is known that a cloth positioner 10 for continuous processing according to this invention comprises a processing base 20, an alignment plate 30 provided on the processing base 20, and at least one figure position abutment pin piece 40. The processing base 20 includes a plurality of thru holes 21. The alignment plate 30 includes at least one pin piece slot 31 matching with the figure position abutment pin piece 40, a plurality of air pressure vents 32, and at least one laser cutting line groove 3. The laser cutting line groove 33 is formed to mainly protect a cutting area corresponding to the alignment plate 30 from being damaged with the heat caused at the time of laser cutting, and a convection channel for a laser cutting machine (a conventional machine, not shown) may be formed below to absorb the exhaust, which thereby decreases the issue of pollution of the exhaust generated at the time of laser cutting to the cloth 50. With the figure position abutment pin piece 40 that is provided for fixing a cloth 50 onto the pin piece slot 31, the cloth 50 is positioned on the cloth positioner 10 for continuous processing. The alignment plate 30 is made of a high-temperature-resistant material. figure position abutment pin piece 40 may have an irregular outer profile as shown in FIGS. 1 through 3 or may have a geometric profile as shown in FIGS. 7 and 8. However, the figure position abutment pin piece 40 and the pin piece slot 31 are configured mainly in an inward area formed from the laser cutting line groove 33 or may also certainly be configured in an outward area formed from the laser cutting line groove 33. It is remarkable that the figure position abutment pin piece 40 also comprises a body 41 used for matching with and being loaded into the pin piece slot 31, and a clamping part 42 used for connecting to the body 41 and fixing the cloth 50. The clamping part 42 is an industrial and high-temperature-resistant magic felt, as shown in FIGS. 1 through 3, or a metal nail, as shown in FIGS. 7 and 8. In this invention, the metal nail is preferably smaller to easily pass through the knitted texture of the cloth 50, thereby fixing the cloth 50. Further, the cloth 50 may be taken out of the metal nail after the continuous processing, and the knitted texture of the cloth 50 may fast recover and no hole is left on the cloth 50. The metal nail preferably has a diameter of approximately 1.5 mm. The body 41 may be a high-temperature-resistant wooden sheet or plastic sheet. Besides, the means of fixing of the body 41 to the clamping part 42 is implemented optionally with machine sewing, gluing, riveting, or screwing or their combination. Further, it is nevertheless especially noted that the processing base 20 is provided to mainly locate and support the alignment plate 30. The processing base 20 includes a plurality of thru holes 21, and the thru hole 21 is mainly a honeycomb core plate (SUS304 stainless steel plate of 5 mm thickness) that provides a good anti-laser-cutting performance. When the cloth 50 is cut in the manner of laser cutting, the cloth 50 is subject to the heat and then causes exhaust, and with the thru holes 21 having the performance of ventilation, the exhaust pollution to the cloth 50 is thereby decreased. Besides, a frame 22 may be set around the processing base 20. The frame 22 allows the alignment plate 30 to be placed on the processing base 20 for fast positioning, and protect the alignment plate 30 from relative offset when being positioned on the processing base during processing. The alignment plate 30 is normally fixed onto the processing base 20, so when the alignment plate 30 is fixed onto the processing base 20, the frame 22 makes the alignment plate 30 to be merely stably fixed; namely, it is provided to avoid the alignment plate 30 from relative offset from the processing base 20. However, the alignment plate 30 may be fixed onto the processing base 20 with a high-temperature-resistant tying part or steel nail that passes through the air pressure vents of the alignment plate 30 or through the thru holes 21 of the processing base 20, thereby the alignment plate 30 being tied or securely fixed onto the processing base 20.

Figure 4:
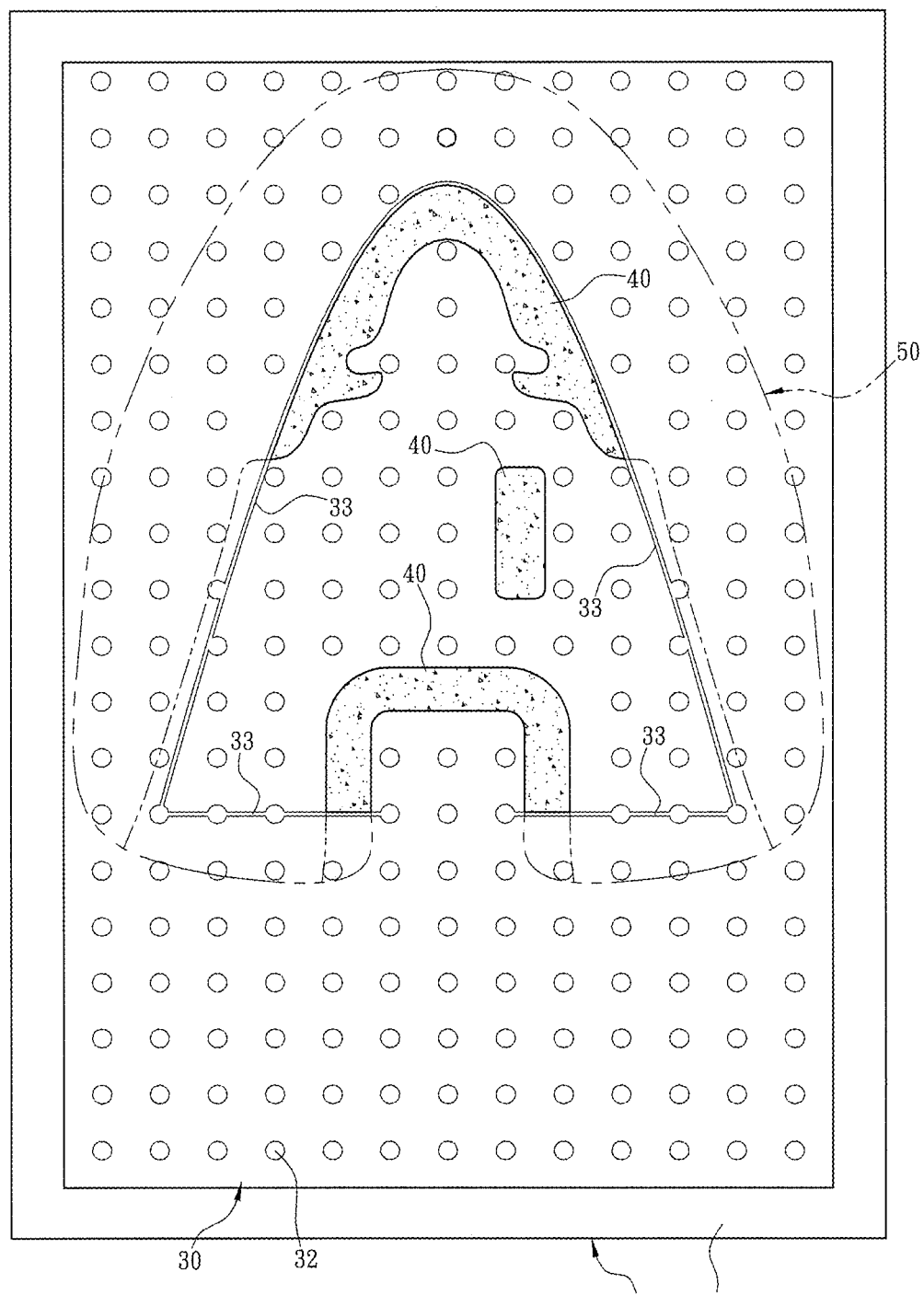
FIG. 4 is a downward-looking plan view illustrating that the figure position abutment pin piece, after being loaded into the pin piece slot, is corresponding to a cloth position in the first preferred embodiment of this invention.
Figure 5:
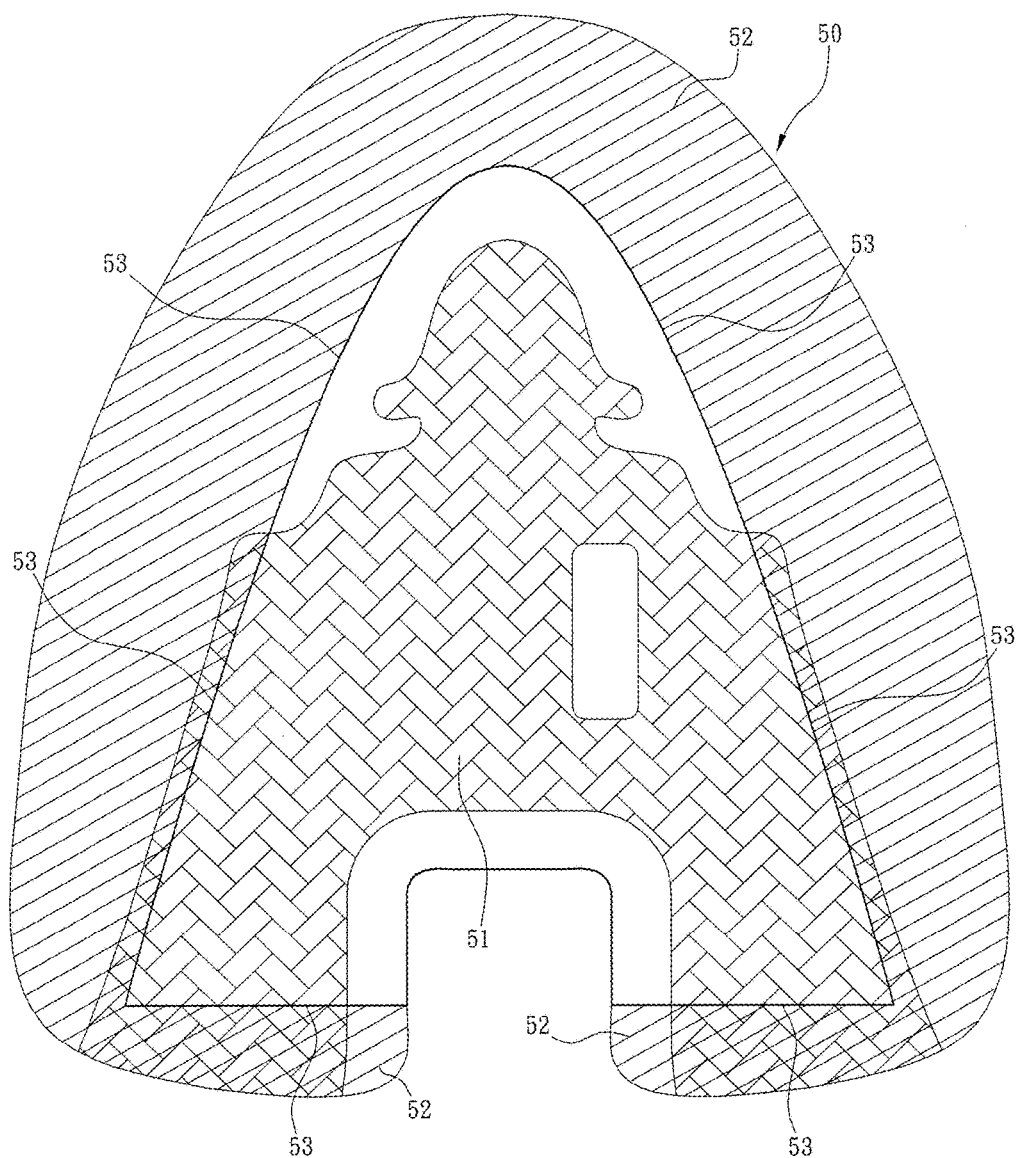
FIG. 5 is a downward-looking plan view illustrating a cutting area and a cutting line that are formed in a laser cutting line groove to which the cloth is corresponding in the first preferred embodiment of this invention.
Figure 6:
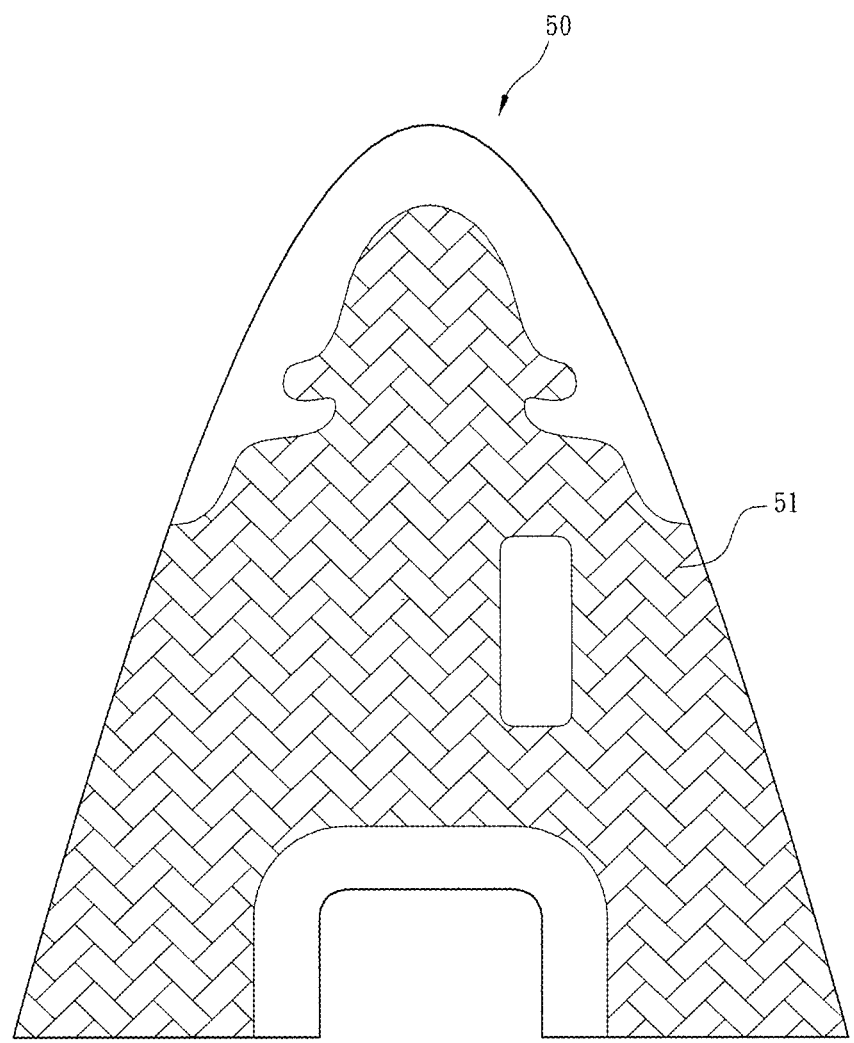
FIG. 6 is a downward-looking plan view illustrating the appearance of a cut cloth formed after the cloth is continuously processed in the first preferred embodiment of this invention.

Again, refer to FIGS. 3 through 5 that are respectively a schematic view of the isometric appearance of the cloth positioner in which a figure position abutment pin piece is positioned in and fixed to the a cloth, a downward-looking plan view illustrating that the figure position abutment pin piece, after being loaded into the pin piece slot, is corresponding to a cloth position, and a downward-looking plan view illustrating a cutting area and a cutting line that are formed in a laser cutting line groove to which the cloth is corresponding in the first preferred embodiment of this invention. Firstly, as shown in FIG. 3, it is apparent that the cloth 50 shown in the first preferred embodiment is a processed upper as a semi-product that is taken for example, and thus the cloth 50 is a material for a shoe template. It is also visible from the figure that the cloth 50 is pre-designed and knitted into a fabric 51. The outer profiles of the figure position abutment pin piece 40 and pin piece slot 31 are actually related to a position of the fabric 51 onto which the figure position abutment pin piece 40 is fixed and to the outer profile of the fabric. Namely, the figure position abutment pin piece 40 is located and fixed onto an area that allows the figure position abutment pin piece 40 keep away from the fabric 51, and after being loaded into the pin piece slot 31, the figure position abutment pin piece 40 should not block the laser cutting line groove 33. Thus, with respect to the outer profile of the fabric 51 and the position where the laser cutting line groove 33 is formed, the figure position abutment pin piece 40 and the pin piece slot 31 may have an irregular outer profile as shown in FIG. 1. When the figure position abutment pin piece 40 is fixed below the cloth 50, after the figure position abutment pin piece 40 is loaded into the pin piece slot 31, the cloth 50 is positioned relative to the cloth positioner 10, as shown in FIG. 4; it is visible from FIG. 4 that some of the portions of the fabric 51 of the cloth 50 cover the laser cutting line groove 33, so the cloth 50 located in a position corresponding relatively to the position where the laser cutting line groove 33 is formed gives a cutting line 53, as shown in FIG. 5, for a laser cutting machine (a conventional machine, not shown), and gives a cut area 52 of the cloth 50 that is formed outwards from the cutting line 53, as shown in FIG. 5. Thus, after the cloth 50 is fixed onto the cloth positioner 10 and processed in the continuous processing steps (ironing step, thermo-compression step, printing and dyeing step, and cutting step), the cut area 52 formed out of the cloth 50 is cut by the laser cutting machine along the cutting line 53 into an upper as a semi-product, as shown in FIG. 6. It is nevertheless especially noted that the continuous processing comprises at least: 1. Ironing step, in which after being loosen with vapor, the cloth 50 is ironed and flatted with an iron, or a specified portion of the cloth 50 may be inserted with a copper nail (not shown) and then ironed for a round hole formed after the copper nail is removed; 2. thermo-compression step, in which after a (metallic) template is heated in a high temperature (120☐), an adhesive film/plastic material is compressed onto the cloth 50; 3. printing and dyeing step, in which the cloth 50 is printed and dyed with a paint; 4. cutting step, in which the cloth 50 is cut by a laser cutting machine for its outer profile of a demanded size. Besides, after the cloth 50 is processed with the cloth positioner 10 in the continuous processing, the cloth positioner 10 may be still repeatedly used for another cloth 50; namely, the continuous processing, the cloth positioner 10 may be repeatedly used. The manners and steps in which the continuous processing, the cloth positioner 10 is repeatedly used are described below. 1. The alignment plate 30 is aligned with and fixed onto the processing base 20. 2. A specified portion of the cloth 50 is fixed with the figure position abutment pin piece 40. 3. The figure position abutment pin piece 40 is matched with and loaded into the pin piece slot 31 on the alignment plate 30. 4. The cloth 50 fixed onto the cloth positioner 10 is continuously processed in the steps of ironing/thermo-compression/printing and dying/cutting. 5. The cloth 50 is taken out of the pin piece slot 31 together with the figure position abutment pin piece 40. 6. The cut area 52 formed after the cloth 50 is cut is removed and the figure position abutment pin piece 40 is removed to obtain the semi-product of the cloth formed with a determined outer profile. 7. The figure position abutment pin piece 40 is re-fixed onto a specified portion of another cloth 50. 8. The manners and steps 3 through 7 are repeated. Accordingly, the cloth positioner 10 may be repeatedly used.

Figure 9:
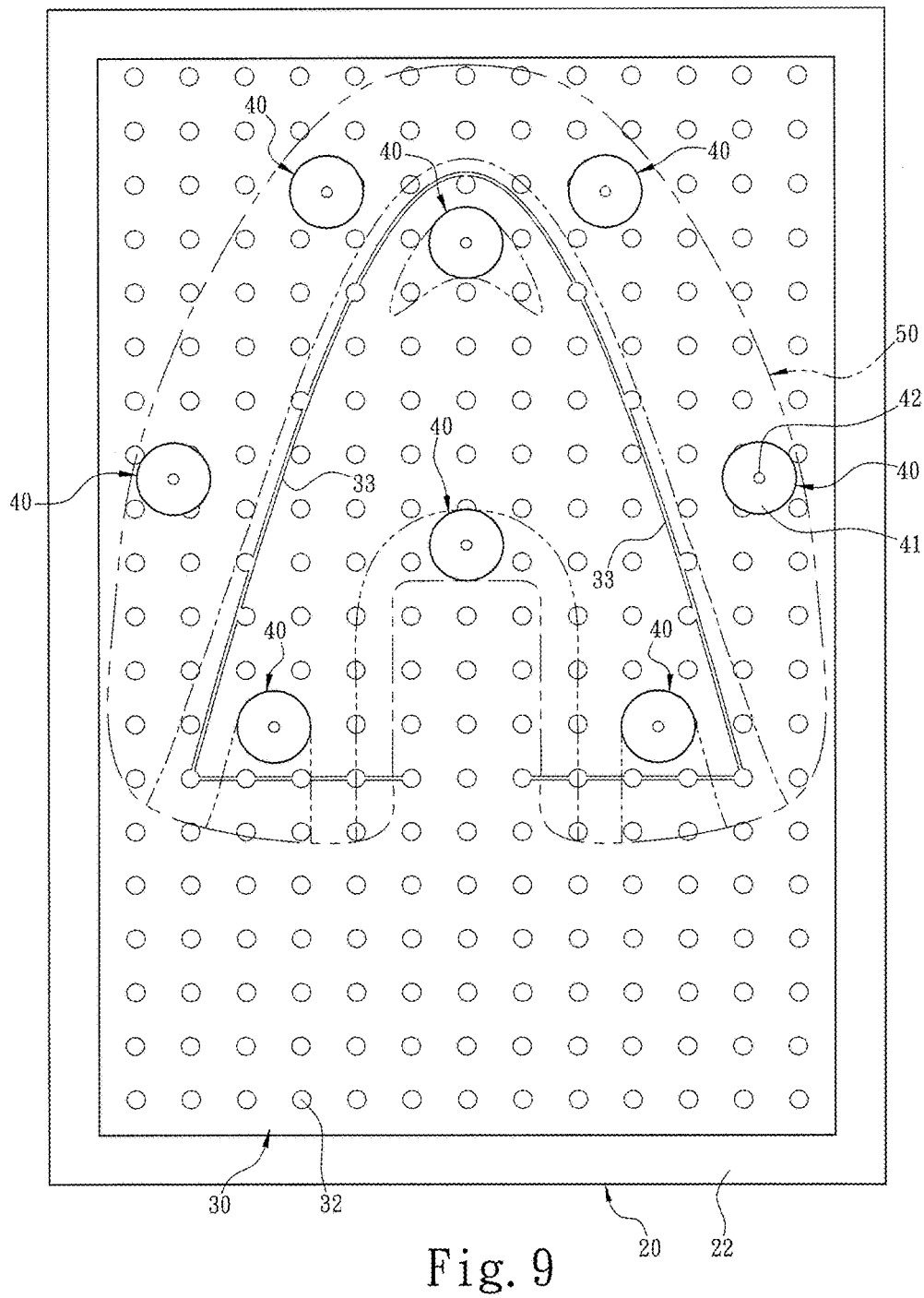
FIG. 9 is a schematic top view illustrating that the figure position abutment pin piece, after being loaded into the pin piece slot, is corresponding to a cloth position in the second preferred embodiment of this invention.
Figure 10:
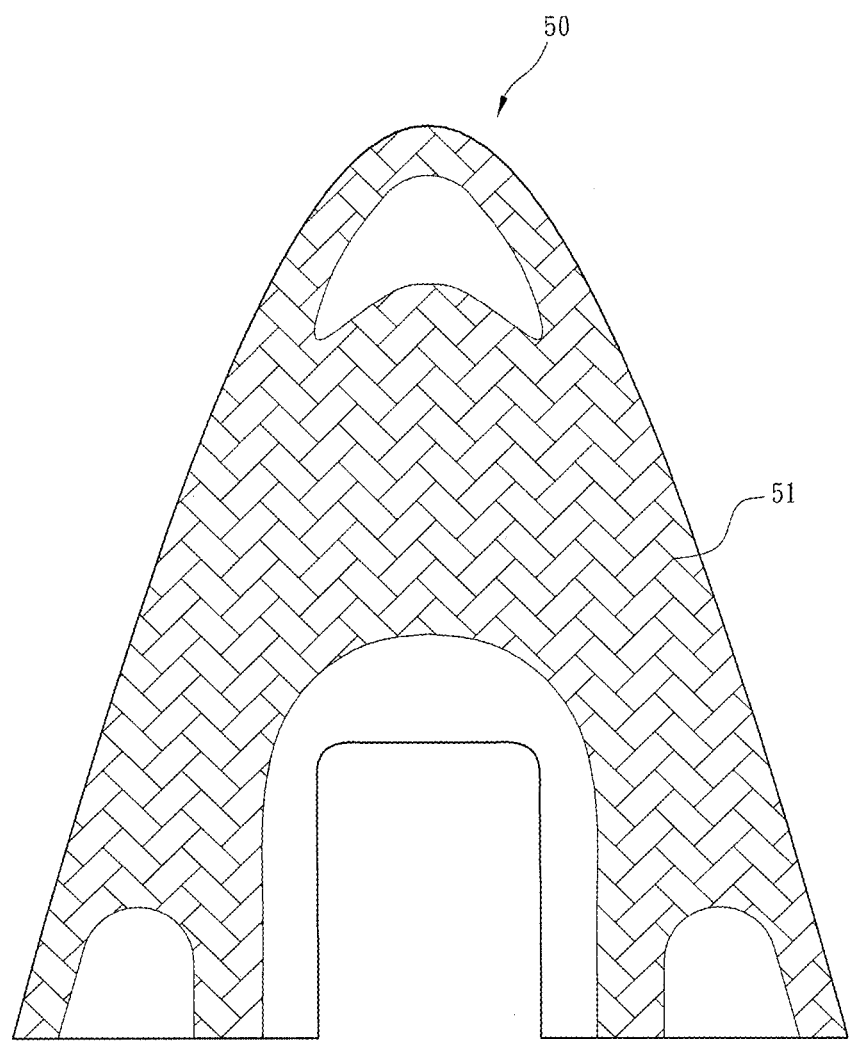
FIG. 10 is a downward-looking plan view illustrating the appearance of a cut cloth formed after the cloth is continuously processed in the second preferred embodiment of this invention.

Further, refer to FIGS. 9 and 10 that are respectively a schematic top view illustrating that the figure position abutment pin piece, after being loaded into the pin piece slot, is corresponding to a cloth position, and a downward-looking plan view illustrating the appearance of a cut cloth formed after the cloth is continuously processed in the second preferred embodiment of this invention. The second preferred embodiment of this invention is different from the first preferred embodiment of this invention in that the cloth 50 in the second preferred embodiment of this invention is pre-designed and knitted and is different from the portion of another fabric 51 in the first preferred embodiment of this invention. Thus, in order to save time of designing the profiles of the figure position abutment pin piece 40 and pin piece slot 31, the figure position abutment pin piece 40 and pin piece slot 31 may be also designed in a simple way to a round (geometric) profile as shown in the figure with respect to the outer profile of the fabric 51 and the position where the laser cutting line groove 33 is formed. Thus, when the figure position abutment pin piece 40 is fixed below the cloth 50, after the figure position abutment pin piece 40 is loaded into the pin piece slot 31, the cloth 50 is positioned relative to the cloth positioner 10, as shown in FIG. 9. It is visible from FIG. 9 that some of the portions of the fabric 51 of the cloth 50 cover the laser cutting line groove 33. Thus, after the cloth 50 is fixed onto the cloth positioner 10 and processed in the continuous processing steps (ironing step, thermo-compression step, printing and dyeing step, and cutting step), the cut area 52 formed out of the cloth 50 is cut by the laser cutting machine along the cutting line 53 into an upper as a semi-product, as shown in FIG. 10.

What is claimed is:

1. A cloth positioner for continuous processing, comprising:
    a processing base;
    an alignment plate provided on the processing base; and
    at least one figure position abutment pin piece,
    wherein the processing base includes a plurality of thru holes and the alignment plate includes at least one pin piece slot matching with the at least one figure position abutment pin piece, a plurality of air pressure vents, and at least one laser cutting line groove,
    wherein the at least one figure position abutment pin piece comprises a body used for matching with and being loaded into the pin piece slot, and a clamping part used for connecting to the body and fixing the cloth, and
    with the at least one figure position abutment pin piece that is provided for fixing a cloth onto the pin piece slot, the cloth is positioned on the cloth positioner for continuous processing.

2. The cloth positioner for continuous processing according to claim 1, wherein the clamping part is an industrial hook and loop fastener or a metal nail.

3. The cloth positioner for continuous processing according to claim 1, wherein the body is a wooden sheet or plastic sheet.

4. The cloth positioner for continuous processing according to claim 2, wherein the body is a wooden sheet or plastic sheet.

5. The cloth positioner for continuous processing according to claim 1, wherein a connection between the body and the clamping part is selected from the group consisting of machine sewing, gluing, riveting, screwing and a combination thereof.

6. The cloth positioner for continuous processing according to claim 2, wherein a connection between the body and the clamping part is selected from the grow consisting of machine sewing, gluing, riveting, screwing and a combination thereof.

7. The cloth positioner for continuous processing according to claim 3, wherein a connection between the body and the clamping part is selected from the group consisting of machine sewing, gluing, riveting, screwing and a combination thereof.

8. The cloth positioner for continuous processing according to claim 4, wherein a connection between the body and the clamping part is selected from the group consisting of machine sewing, gluing, riveting, screwing and a combination thereof.

9. The cloth positioner for continuous processing according to claim 1, wherein a frame is set around the processing base.

10. The cloth positioner for continuous processing according to claim 2, wherein a frame is set around the processing base.

11. The cloth positioner for continuous processing according to claim 3, wherein a frame is set around the processing base.

12. The cloth positioner for continuous processing according to claim 5, wherein a frame is set around the processing base.

* * * * *